Sept. 19, 1967  G. DEARSLEY  3,342,313
CONVEYING SYSTEMS
Filed Nov. 18, 1965

INVENTOR.
GEORGE DEARSLEY
BY
ATTORNEY 3,342,313
CONVEYING SYSTEMS
George Dearsley, Richmond, Va., assignor to American Machine & Foundry Company, a corporation of New Jersey
Filed Nov. 18, 1965, Ser. No. 508,505
7 Claims. (Cl. 198—211)

The present invention relates to apparatus for moving and controlling the movement of articles in conveyor systems and in particular to a resilient roller for controlling the travel of cigarettes in a pneumatic conveying system.

It is very common practice to control the movement of delicate articles by means of soft textured resilient rollers or belts. Before foam rubber or other plastics were available such materials as plush or velvet, soft brushes, etc., were in common use; but today, foamed materials with the infinite variety of textures available are more generally employed.

While foam rollers are commonly used on cigarette making machines, filter tip attachments and on some types of packaging machines, they have been found to have serious deficiencies which constitute a significant problem in the conveying systems of such mechanisms.

Cigarettes and cigars generally thought of as being fragile articles, are in the high speed machinery used for their manufacture rather abrasive and destructive of rubber and plastic foam rollers. It is thus difficult in such conveyor systems to make foam rollers run concentrically or to insure a relatively long life or to maintain fixed adjustment. In fact, faulty adjustment or the need for adjustment unfortunately only becomes apparent when the rollers cease to function properly, resulting in the malfunctioning of the entire apparatus.

It is the object of the present invention to provide a roll or roller means overcoming the serious deficiencies to the prior art. It is a particular object to provide a new resilient roller means not employing solid foam bodies. It is another object of the present invention to provide a roll means which is simple and inexpensive to manufacture. Still another object of this invention is to provide a flexible roller which is self adjusting to accommodate wear. A further object of this invention is to provide a flexible roller which does not need adjustment when it is replaced or renewed.

These and other objects and advantages will become apparent from the description which is to follow of the present invention.

It is to be noted that in the following description emphasis is made on the form and structure of the present invention, as applied to a pneumatic conveying device for conveying individual cigarettes longitudinally therealong. However, it should be quite clear that such rollers are as efficient and advantageous in other types of conveying systems both of the pneumatic and mechanical design and that the present description is not to be taken as limiting of the present invention but as being merely illustrative thereof.

Figure 1:
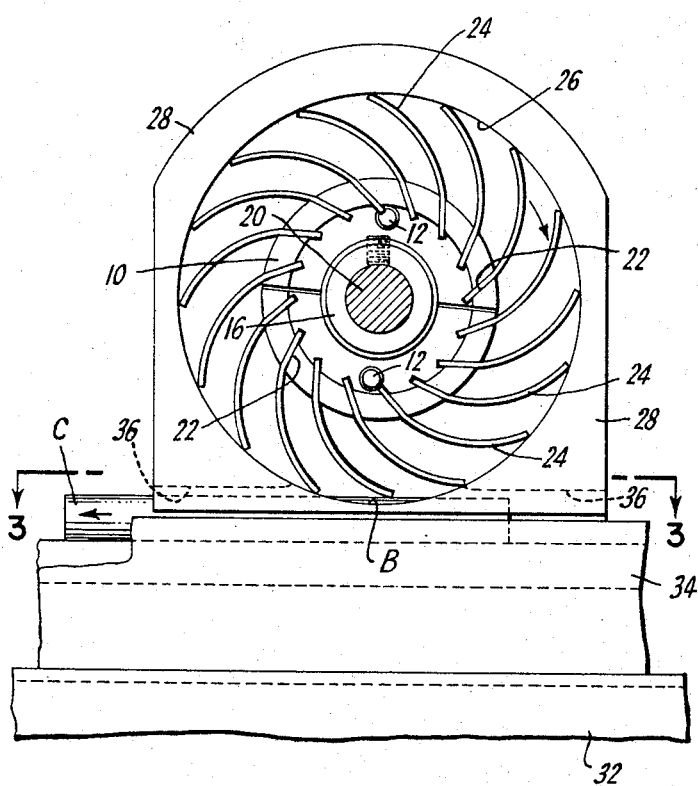
FIG. 1 is a side elevation of the self-adjusting resilient roller.
Figure 2:
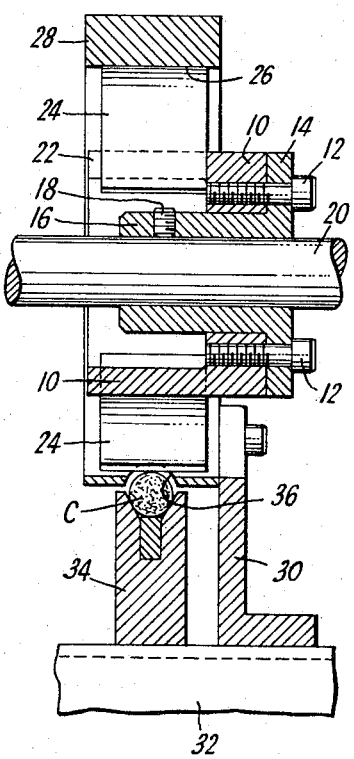
FIG. 2 is a sectional end elevation of the same.
Figure 3:
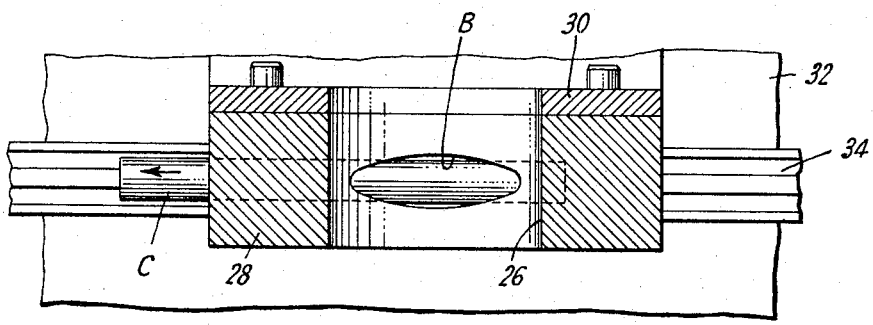
FIG. 3 is a sectional plan view, taken on line 3—3 of FIG. 1.

With reference to the drawings, the roller assembly of the present invention consists of a rotating roller drum 10 which, by means of a pair of screws 12 is mounted on a flange 14 of a hub 16 which in turn by a set screw 18 is secured to a horizontal drive shaft 20. The roller drum 10 is provided with a plurality of suitable slits 22 into which are placed flexible blade or vane members 24 made of any suitable material and thickness, depending upon the degree of resilience desired. Blades of rubber of various grades, flexible plastic sheet of any variety, sheeting of impregnated cotton or synthetic fibers or plain woven or felted materials, spring steel, etc., are examples of materials which may be employed to suit particular conditions.

The roller 10 is mounted within a housing 28. Housing 28 has an inner surface spaced from, in this case annularly spaced from, the roller drum 10 which defines a concentric guide surface 26 upon which the flexible members 24 sweep or fly. The blades 24 are of such a length that they more than subtend the annular space formed between the roller drum 10 and the inner surface 26. The housing 28 is secured to a suitable bracket 30 which in turn is mounted on a suitable frame portion 32 or table of the machine. Adjustable mountings may be provided.

The housing is mounted above any suitable conveyor, having transport means such as an air flow cigarette floatation conveyor 34 illustrated along which cigarettes are conveyed from one point to another. As illustrated in the drawings, the bottom portion of the housing 28 is provided with an opening or groove 36 extending chordally to the circular or annular guide surface 26 communicating with the transport means. The groove 36 is so arranged as to intersect the circular guide surface 26 at its lowermost point B so that as the blades 24 sweep around said surface, they will contact passing cigarettes C by an amount depending upon the position of the housing 28 above the floatation conveyor 34 which supports the passing cigarettes. For the sake of brevity details of the conveyor, means for rotating the drum and other construction details are omitted. Such details are believed to be obvious.

As illustrated in the drawings, the blades 24 are sufficiently wide to be in constant contact with the annular guide face 26 on either side of the groove 36, thus obtaining a perfect control over the amount of interference between the rotating blades and the passing cigarettes.

The pressure exerted may be adjusted by raising or lowering the housing 28 with respect to the cigarettes, also by altering the lengths of the blades 24 or by changing the thickness of the material of which the blades are made.

Another important feature of the apparatus that is readily apparent is that the blades 24 will always contact the guide face 26 throughout the whole of their life, being held against the guide by the spring of the material aided by centrifugal force. As an example, blades may be provided which project beyond the body by 1 inch which will still function satisfactorily when worn down to less than ¾ inch. As the pressure between blade and guide is very light, this will account for an extended period (6 or 8 weeks) of running during the whole of which time the interference between blades and cigarettes remains unchanged while the pressure exerted between them likewise remains substantially unchanged.

Thus long operating life is obtained, providing constant-conditions and completely eliminating the need for adjustment or other maintenance.

In addition, when the blades are finally worn out, each half of the rotor may be removed by unscrewing only one screw and replaced by a new one. Because the new rotor blades are guided by the same guide surface, in spite of their extra length, as compared with the worn blades, they will function exactly as the old ones without further adjustment.

In other words, when changing rotors, it is never necessary to make adjustments, permitting immediate start-up.

It is obvious that this type of construction can be extended to include endless belts, chains.

The self-adjusting resilient rollers described above serve the great need of reliable and long lasting speed-up or metering rollers to be used with fragile elongated articles such as cigarettes, cigars, etc. This long operating life is obtained providing constant-conditions, completely eliminating the need for adjustment or other maintenance. The ability for fast and easy roll replacement eliminates the need for adjustment means of any kind and permits immediate replacement and start-up.

Since it will be obvious that the concept of the present invention has a wider utility than in the specific structure shown, it is understood that the invention should not be limited except by the scope of the appended claims.

What is claimed is:

1. In a system for conveying cylindrical objects such as cigarettes having means for transporting said objects a roller assembly adapted to be mounted in conjunction with said transport means comprising, a body adapted for rotation, said body having a plurality of flexible members extending outwardly therefrom, a housing surrounding said body and defining a guide surface spaced from said body curvilinearly bending said flexible members upon rotation of said body, an opening intersecting said guide surface and adapted to conform to said objects being conveyed to permit said curvilinearly flexed members to engage said objects.

2. The assembly as defined in claim 1 wherein said housing defines a circular guide surface about said body.

3. The assembly as defined in claim 1 wherein the said housing defines a cam shaped guide surface about said body.

4. The assembly as defined in claim 1 wherein said opening in said housing intersects said guide surface in a direction perpendicular to the axis of rotation of said body.

5. The assembly as defined in claim 1 wherein the flexible members are sufficiently long to maintain contact with the surrounding guide surface as they shorten due to wear, maintaining constant engagement with the objects being conveyed as wear takes place.

6. In a system for conveying cylindrical objects such as cigarettes having means for transporting said objects, a roller assembly adapted to be mounted in conjunction with said transport means comprising, a drum adapted to be rotated about its central axis, said drum having attached thereto a plurality of flexible strip members extending radially outwardly therefrom, a housing surrounding said drum and spaced therefrom, said housing having an inner member defining an annular guide surface for curvilinearly bending said flexible members, said guide surface being spaced from said drum a distance no greater than the length of said flexible members, said housing having an opening intersecting said guide surface chordally thereof, and means mounting said assembly in conjunction with said transport means so that said opening communicates with said transport means, said flexible members being thereby adapted to engage objects on said transport means when said drum is rotated.

7. In a system for conveying cylindrical objects such as cigarettes having means for transporting said objects, means carrying a multiplicity of flexible blades through a predetermined path, a guide surface suitably shaped to surround at least a portion of said path, said flexible blades being sufficiently long to insure that their extremities are curvilinearly sprung against the guide surface which thereby controls the path of said extremities, a channel through which articles being conveyed pass, said channel intersecting said guide surface for at least a portion of its periphery permitting the extremities of said flexible blades to engage said conveyed articles for any predetermined distance.

References Cited
UNITED STATES PATENTS

| | | | |
|---|---|---|---|
| 983,568 | 2/1911 | Reinecke | 198—211 X |
| 2,961,085 | 11/1960 | Stovall | 198—167 X |
| 3,215,261 | 11/1965 | Smith | 198—167 X |
| 3,292,836 | 12/1966 | Koch | 226—190 |

ANDRES H. NIELSEN, *Primary Examiner.*

EVON C. BLUNK, *Examiner.*

EDWARD A. SROKA, *Assistant Examiner.*